July 4, 1961 A. A. WAGNER 2,991,095
PIPE RAILING FITTING
Filed June 8, 1959 2 Sheets-Sheet 2

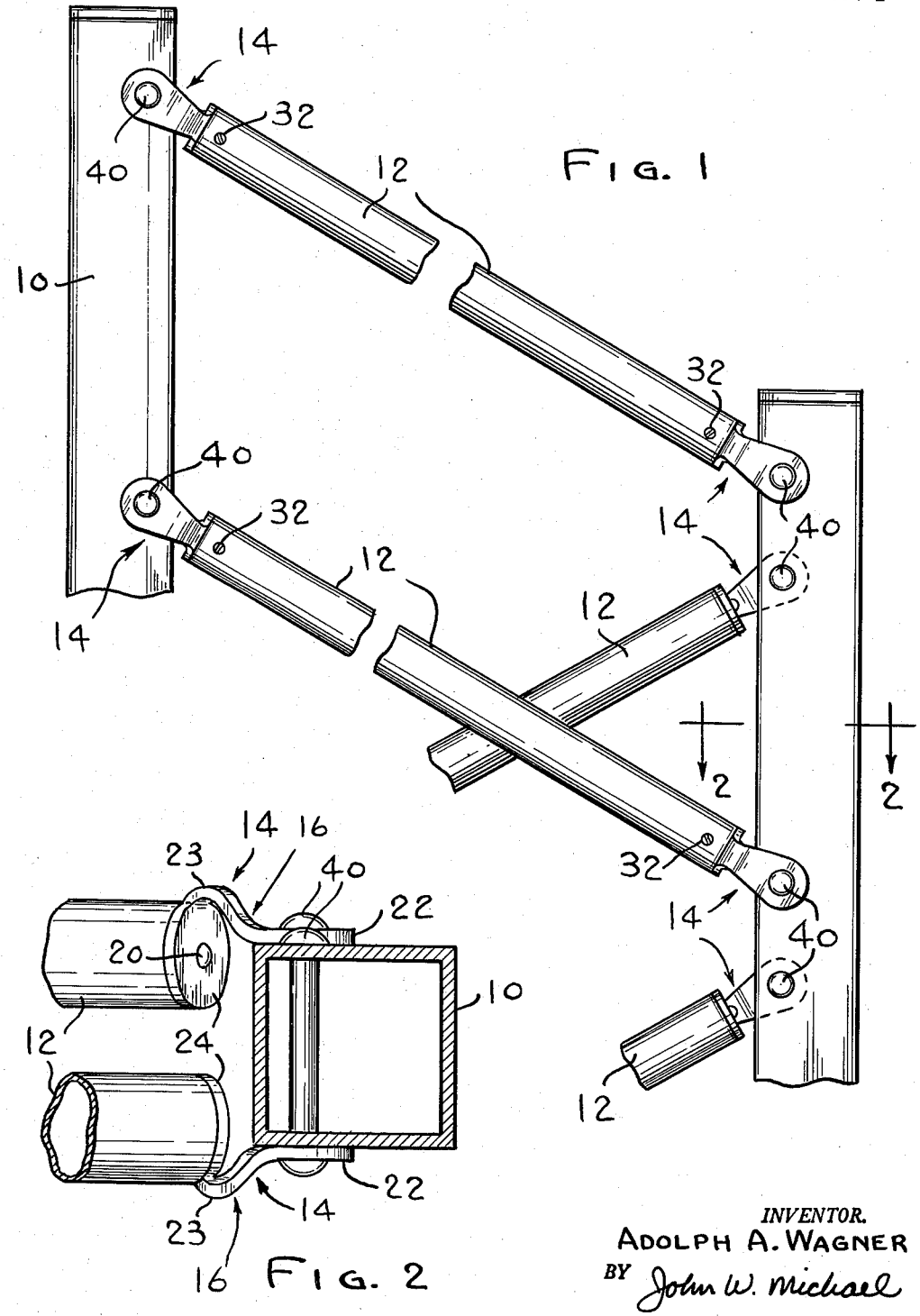

INVENTOR.
ADOLPH A. WAGNER
BY John W. Michael
ATTORNEY

2,991,095
PIPE RAILING FITTING
Adolph A. Wagner, Milwaukee, Wis., assignor to R & B Wagner, Inc., Milwaukee, Wis., a corporation of Wisconsin
Filed June 8, 1959, Ser. No. 818,900
2 Claims. (Cl. 287—20)

This invention relates to pipe railing fittings of the type used to secure a pipe railing to a support such as a wall or post.

Fittings of this type include a yoke which fits into the open end of a pipe railing and a mounting bracket fastened to the yoke and adapted for connection to a support. The one-piece cast fittings of the prior art not only were heavy and cumbersome to handle but caused assembly problems because of the difficulty experienced in aligning the mounting brackets of the fittings with the supports after the fittings have been installed in the ends of a pipe railing.

The object of this invention, therefore, is to provide an improved fitting of this type which is light weight, inexpensive to manufacture, and can be readily aligned wtih the supports to facilitate assembly of the pipe railings.

This object is attained by fabricating a fitting from steel stampings which have been formed into a U-shaped yoke adapted for insertion in the open end of a pipe railing and an L-shaped mounting bracket adapted for connection to a wall or post. The yoke and mounting bracket are pivotally connected together so that the mounting brackets can be readily adjusted for connection to the support posts after the fittings have been installed in the ends of a pipe railing.

Other objects and advantages will be pointed out in, or be apparent from the specification and claims, as will obvious modifications of the single embodiment shown in the drawings, in which:

FIG. 1 is a fragmentary elevation view of an installation in which fittings embodying my invention have been used;

FIG. 2 is a sectional view taken along line 2—2 of FIG. 1;

Figure 6:
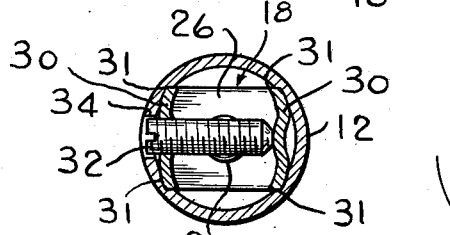
FIG. 6 is a sectional view taken along line 6—6 of FIG. 3.
Figure 7:
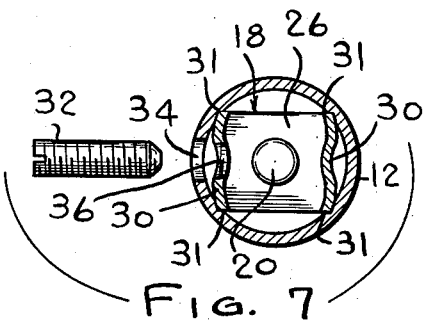
FIG. 7 is a view similar to FIG. 6 showing the parts before the yoke is secured in the pipe railing.

Referring to the drawings, FIG. 1 shows an installation having pipe railings 12 interconnected between posts 10 by means of my improved fittings 14. Fittings 14 are of two-piece construction and consist of an L-shaped mounting bracket 16 and a U-shaped yoke 18 with the two parts pivotally secured together by any suitable means such as a rivet 20. A pipe railing is prepared for erection by first drilling holes 34 at each end thereof and then inserting yoke 18 of a fitting 14 into the open ends of the pipe. Yoke 18 has a base portion 26 and legs 30 which take a friction grip on the pipe interior. One of the legs has a threaded opening 36 which receives a screw 32 that is inserted through opening 34 in the pipe wall. Screw 32 is tightened against the other leg which expands the yoke and causes outturned edges 31 (FIG. 6) of the legs to bite into the pipe wall to securely lock the yoke in place. As stated previously, base portion 26 of U-shaped yoke 18 is pivotally connected to mounting bracket 16 by a rivet 20. Bracket 16 has a circular base 24 abutting portion 26 of the yoke and a connector portion 22 with an opening 38 through which a suitable fastener can be passed to secure the connector, and hence the pipe railing, to a post or wall. Thus, after a pair of fittings 14 have been securely mounted in ends of a pipe railing, the assembled unit is secured in place by rivets 40 as shown in FIG. 2. It is noted by that pivoting the mounting brackets as required, such brackets can be readily aligned with the openings in posts 10 to thereby facilitate erection of the structure. Both mounting brackets 16 and yokes 18 of fittings 14 are made from steel stampings resulting in a light-weight, inexpensive fitting.

Figure 3:
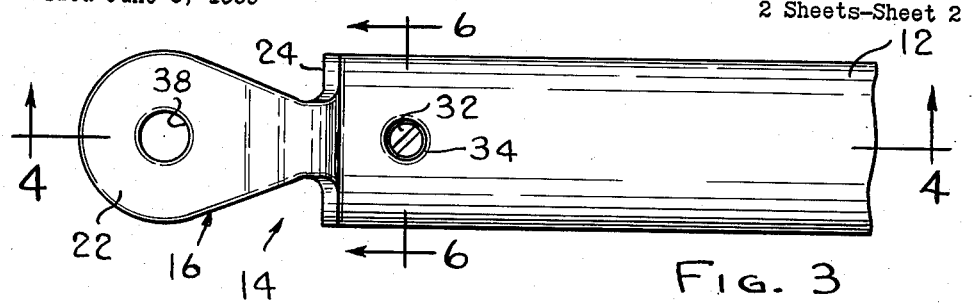
FIG. 3 is a fragmentary view of a pipe railing having a fitting embodying my invention installed therein.
Figure 4:
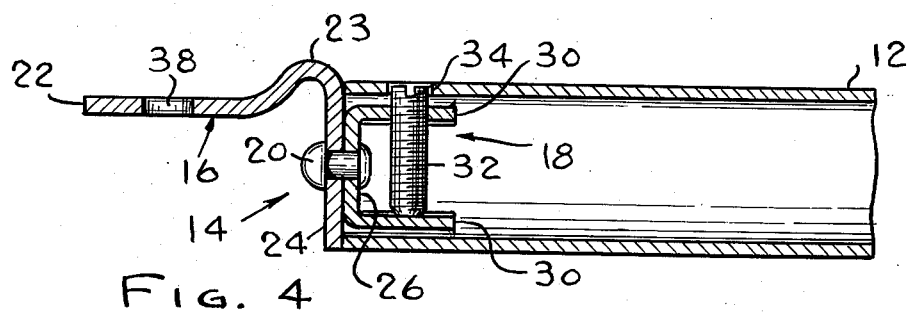
FIG. 4 is a sectional view taken along line 4—4 of FIG. 3.
Figure 5:
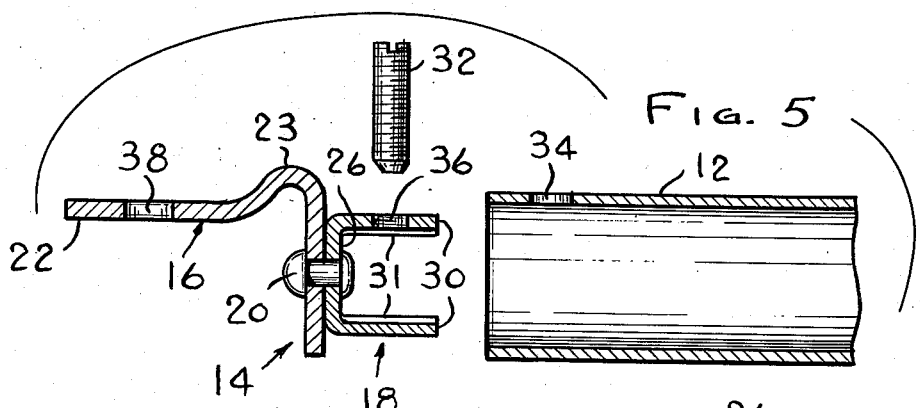
FIG. 5 is an exploded view of the parts shown in FIG. 4.

It is desirable that the center line of the pipe railings of a fire escape, for example, be aligned with the centerline of the channel stringers which support the posts. This relationship is accomplished by offsetting connector portions 22 of brackets 16 inwardly from the periphery of circular base portions 24 of the brackets as shown. This offsetting cannot be satisfactorily accomplished by making brackets 16 a simple right-angle bracket since it would leave an opening between the pipe end and bracket through which moisture, dirt, etc. could get inside the pipe railing. Both the desired offset and sealing relationship are attained by forming a gooseneck 23 in the stamped bracket between connector 22 and base 24, as shown in FIG. 4.

Although but one embodiment of the present invention has been illustrated and described, it will be apparent to those skilled in the art that various changes and modifications may be made therein without departing from the spirit of the invention or from the scope of the appended claims.

I claim:
1. A fitting for connecting a pipe railing to a support comprising, a U-shaped yoke having a base and a pair of legs, said legs adapted for insertion into the open end of the pipe, an L-shaped mounting bracket having a base portion and a connector portion, said base portions of said yoke and bracket pivotally connected to each other, and means for expanding said legs of said yoke inside the pipe to securely mount the yoke of said fitting inside the pipe.

2. A fitting according to claim 1 in which said means includes aligned openings in said pipe and one of said legs and a set screw adapted to be threaded into said openings to expand the legs of said yoke.

References Cited in the file of this patent

UNITED STATES PATENTS

| | | |
|---|---|---|
| 318,772 | McCumber | May 26, 1885 |
| 601,613 | Castle | Mar. 29, 1898 |
| 992,338 | Carpenter et al. | May 16, 1911 |
| 1,630,519 | Blakeley et al. | May 31, 1927 |
| 1,650,245 | Thompson | Nov. 22, 1927 |
| 2,764,438 | Haviland | Sept. 25, 1956 |